(12) United States Patent
Zhang et al.

(10) Patent No.: US 12,467,575 B2
(45) Date of Patent: Nov. 11, 2025

(54) FLEXIBLE ADAPTIVE LARGE LENGTH TO THIN RATIO PIPELINE INTELLIGENT REPAIR DEVICE AND USE METHOD

(71) Applicant: Nanchang Hangkong University, Nanchang (CN)

(72) Inventors: Timing Zhang, Nanchang (CN); Yuhua Chen, Nanchang (CN); Jiaxing Guo, Nanchang (CN); Shiyi Zhang, Nanchang (CN); Shanlin Wang, Nanchang (CN); Jilin Xie, Nanchang (CN); Limeng Yin, Nanchang (CN); Yanlin Jia, Nanchang (CN); Zhikang Ye, Nanchang (CN)

(73) Assignee: Nanchang Hangkong University, Nanchang (CN)

( * ) Notice: Subject to any disclaimer, the term of this patent is extended or adjusted under 35 U.S.C. 154(b) by 448 days.

(21) Appl. No.: 18/133,533

(22) Filed: Apr. 12, 2023

(65) Prior Publication Data
US 2024/0052964 A1 Feb. 15, 2024

(30) Foreign Application Priority Data
Aug. 12, 2022 (CN) .......................... 202210967266.8

(51) Int. Cl.
*F16L 55/44* (2006.01)
*F16L 55/18* (2006.01)

(52) U.S. Cl.
CPC .............. *F16L 55/44* (2013.01); *F16L 55/18* (2013.01)

(58) Field of Classification Search
CPC .................................. F16L 55/44; F16L 55/18
USPC ......................................................... 138/197
See application file for complete search history.

(56) References Cited

U.S. PATENT DOCUMENTS

| | | | |
|---|---|---|---|
| 6,820,653 B1* | 11/2004 | Schempf ................. | F16L 55/26 15/104.31 |
| 6,966,950 B2* | 11/2005 | Winiewicz .............. | F16L 55/46 118/712 |
| 10,724,669 B1* | 7/2020 | Al-Hannabi ........... | G01B 17/02 |

(Continued)

FOREIGN PATENT DOCUMENTS

| | | |
|---|---|---|
| CN | 210677536 U | 6/2020 |
| CN | 214518423 U | 10/2021 |
| CN | 114473326 A | 5/2022 |

*Primary Examiner* — David R Deal
(74) *Attorney, Agent, or Firm* — Bayramoglu Law Offices LLC

(57) ABSTRACT

A flexible adaptive large length to thin ratio pipeline intelligent repair device is provided. The walking mechanism includes a walking bracket and a radius adjustment assembly. The radius adjustment assembly is located in the middle of the walking bracket. The first motor for driving the radius adjustment assembly is set in the middle of the walking mechanism, and the second motor for driving the movement of the walking bracket is set on the walking bracket. The ends of several groups of connecting rods are removably connected to the working part, which includes the pre-welding sandblasting mechanism, the heating mechanism and the welding repair mechanism. A positioning sensor is set on the walking bracket. The variable-diameter all-position intelligent pipe internal repair device can integrate pre-welding cleaning, preheating, welding repair and post-welding heat treatment.

18 Claims, 5 Drawing Sheets

(56) References Cited

U.S. PATENT DOCUMENTS

| | | | | |
|---|---|---|---|---|
| 2002/0190682 A1* | 12/2002 | Schempf | .............. | G01N 27/902 |
| | | | | 318/568.11 |
| 2009/0307891 A1* | 12/2009 | Offer | .................... | G21C 17/017 |
| | | | | 228/103 |
| 2015/0316195 A1* | 11/2015 | Penza | ..................... | F16L 55/32 |
| | | | | 405/184.1 |
| 2015/0375276 A1* | 12/2015 | Sivacoe | ................ | F16L 55/265 |
| | | | | 15/104.09 |
| 2016/0018045 A1* | 1/2016 | Blackburn | .............. | B08B 9/045 |
| | | | | 239/722 |
| 2018/0326679 A1* | 11/2018 | Weisenberg | ............. | B29C 73/12 |
| 2020/0109811 A1* | 4/2020 | Hernandez | ........... | B25J 11/0075 |
| 2023/0243457 A1* | 8/2023 | Duncan | ................... | F16L 55/32 |
| | | | | 138/97 |

* cited by examiner

FLEXIBLE ADAPTIVE LARGE LENGTH TO THIN RATIO PIPELINE INTELLIGENT REPAIR DEVICE AND USE METHOD

CROSS REFERENCE TO THE RELATED APPLICATIONS

This application is based upon and claims priority to Chinese Patent Application No. 202210967266.8, filed on Aug. 12, 2022, the entire contents of which are incorporated herein by reference.

TECHNICAL FIELD

The present invention relates to the technical field of pipeline maintenance equipment, especially to a flexible adaptive large length to thin ratio pipeline intelligent repair device and use method.

BACKGROUND

Current pipeline rehabilitation technologies can be divided into external rehabilitation and internal rehabilitation, with external rehabilitation generally requiring excavation, high construction volume and high costs. Internal rehabilitation methods include ultraviolet light curing pipe lining rehabilitation technology, grouting or resin repair methods. However, these repair methods are ineffective in repairing localized spots, and cannot clean up the environment inside the pipe to repair instability and low efficiency. The welding repair as a convenient and efficient repair method can solve the above problems. As in Application No. CN201921559444.3, the device requires the pipe to the clamping device on one side of the device, the other side of the welding device through the slide into the inside of the pipe for welding repair. In application No. CN202120486779.8, the device travels on a flexible electromagnetic track, which is laid out in advance, and the main body of the device is fed into the pipe, and the welding repair is carried out by three motors that regulate the position and angle of the welding torch. In application No. CN202210390583.8, the device is carried by a tracked walking device into the interior of the pipe for welding, but it is not resizable and cannot be processed before or after welding. Traditional repair technology requires a lot of operating space, poor accessibility, construction difficulties, the current welding repair, generally through the handheld torch to repair the surface of the pipe, the repair process is more laborious. Therefore, there is an urgent need to develop an internal repair device and method for the repair of pipelines with large length to thin ratio pipeline.

SUMMARY

The purpose of the present invention is to provide a flexible adaptive large length to thin ratio pipeline intelligent repair device and use method, in order to solve the above-mentioned problems of the existing technology, to achieve the integrated repair process of internal pipeline sandblasting and descaling and self-cleaning, preheatable, all-position, and post-treatment.

To achieve the above purpose, the present invention provides the following solution: the present invention provides a flexible adaptive large length to thin ratio pipeline intelligent repair device, including a number of groups of walking mechanism. Each group of walking mechanism includes a walking bracket and a radius adjustment assembly. The radius adjustment assembly is located in the middle of the walking bracket. A first motor for driving the radius adjustment assembly is provided in the middle of the walking mechanism. A second motor is provided on the walking bracket to drive the movement of the walking bracket; the walking bracket is detachably connected to a number of connecting rods, and a number of connecting rods are detachably connected to the end of the working part. The working part includes a pre-welding sandblasting mechanism or a heating mechanism or a welding repair mechanism; the walking bracket is provided with a positioning sensor; two adjacent groups of walking mechanisms are connected to each other by universal joints.

The pre-weld sandblasting mechanism includes a sandblasting head, a first rotating arm to control the rotation of the sandblasting head, a third motor to power the first rotating arm, a first sand storage tank to supply sand to the sandblasting head, and a compressed gas tank to power the sandblasting work of the sandblasting head.

The heating mechanism includes a heating rack and a fourth motor for driving the rotation of the heating rack, and the motor is rotatably connected to the connecting rod.

The welding repair mechanism includes a welding gun, a fifth motor for adjusting the angle of the welding gun, a second rotating arm for controlling the rotation of the welding gun, and a sixth motor for providing power to the second rotating arm.

Preferably, the walking bracket includes two groups of symmetrically arranged walking assembly, the first motor is located between the two groups of walking assembly and fixed connection with both groups of walking assembly, the output shaft of the first motor and the two groups of walking assembly are arranged vertically; each group of walking assembly includes a mounting plate, the circumference of the mounting plate is equally spaced hinged with three walking arms, each group of walking arms is connected with a traveling wheel, one group of walking arms is fixed with a second motor for driving the rotation of the traveling wheel.

Preferably, there are two sets of radius adjustment assemblies, and the two sets of radius adjustment assemblies correspond to the two sets of walking assemblies one by one. Each group of radius adjustment includes a connecting plate, and three connecting rods are hinged on the circumference of the connecting plate, and the three connecting rods correspond to the three walking arms one by one, and the corresponding connecting rods are hinged with the walking arms.

A screw is rotatably connected to the middle of one side of the mounting plate away from the first motor, and the screw is threaded on the middle of the connecting plate; the first motor is rotatably connected to the screw through a gear drive assembly.

Preferably, the gear drive assembly includes a first gear and a second gear that engage with each other, and a third gear and a fourth gear that engage with each other. A drive rod is fixedly connected between the second gear and the third gear. The first gear and the second gear are located on the side of one set of mounting plates away from the first motor and are rotatably connected to the mounting plates. The third gear and the fourth gear are located on the side of another set of mounting plates away from the first motor and are rotatably connected to the mounting plates. The output shaft of the first motor runs through the first set of mounting plates and is fixedly connected to the middle of the first gear.

Preferably, there are two sets of screws, the middle of the first gear is fixedly connected to one screw on the side away from the first motor, and the middle of the fourth gear is fixedly connected to another screw on the side away from the first motor; the screw is rotatably connected to a fixing plate on the end away from the first gear, and the fixing plate is fixedly connected to the mounting plate through a connecting rod.

Preferably, the two sets of fixing plates are in the shape of equilateral triangle, and each set of fixing plates is provided with through-holes at the corners, and three connecting rods are provided, and the three connecting rods are arranged parallel and flush at the ends, and the three connecting rods run through the through-holes on the two sets of fixing plates in turn.

Preferably, the compressed air tank is located between three connecting rods and is removably connected to the connecting rods, the compressed air tank is arranged close to the side of the fixed plate and is removably connected to the fixed plate; the first sand storage tank is arranged close to the compressed air tank and the two connecting rods are fixedly connected, the third motor is located below the first sand storage tank, the first rotating arm is located at the end of the connecting rods, and the output shaft of the third motor is fixedly connected to the rotating arm.

The other end of the three connecting rods is provided with a sand suction assembly. The sand suction assembly includes a vacuum pump arranged immediately outside of the other fixed plate. The vacuum pump is connected to the second sand storage tank and the sand suction head, the second sand storage tank is detachably connected to the outside of the connecting rod, and the sand suction head is mounted on the third rotating arm, which is located at the end of the connecting rod and connected to a seventh motor.

Preferably, the heating frame is detachably connected with three sets of arc heating plate outside, and the three sets of heating plate are heated by resistance.

Preferably, the fifth motor is directly connected to the welding gun, the body of the fifth motor is fixedly connected to the side of the second rotating arm, and the sixth motor is located inside the three sets of the connecting rods.

A method of using a flexible adaptive large length to thin ratio pipeline intelligent repair device, comprising the following steps:
a. Connecting the travel mechanism with the pre-weld sandblasting mechanism, the travel mechanism with the heating mechanism and the travel mechanism with the welding repair mechanism in sequence;
b. Place all the connected walking mechanisms into the pipe to be repaired;
c. Adjust the opening radius of each travel mechanism according to the inner diameter of the pipe to be repaired;
d. Control the walking mechanism to move to the position to be repaired inside the pipeline;
e. Control the pre-weld sandblasting mechanism, the heating mechanism and the welding repair mechanism to work sequentially at the position to be repaired.

The present invention discloses the following technical effects:

(1) The present invention provides an intelligent repair device applicable to the internal repair of large length-thin ratio pipelines, which can realize the integrated repair process of internal sandblasting and self-cleaning, preheatable, all-position, and post-processing of the pipeline.

(2) The invention has high efficiency, good quality, low labor intensity, and can realize a series of repair operations such as sandblasting, cleaning, pre-heating, repairing, and post-heating; the device can repair 360° all positions; it is suitable for adaptive repair of large length-thin ratio pipelines, especially bends.

BRIEF DESCRIPTION OF THE DRAWINGS

To more clearly illustrate the technical solutions in the embodiments or prior art of the present invention, the following is a brief description of the accompanying drawings to be used in the embodiments, and it will be apparent that the accompanying drawings in the following description are only some embodiments of the present invention, and that other accompanying drawings may be obtained from these drawings without creative labor to a person of ordinary skill in the art.

Wherein: 1, mounting plate; 2, walking arm; 3, first motor; 4, second motor; 5, connecting rod; 6, fixed plate; 7, traveling wheel; 8, connecting plate; 9, screw; 10, through hole; 11, second gear; 12, first gear; 13, connecting rod; 14, third gear; 15, fourth gear; 16, transmission rod; 17, sixth motor; 18, second rotating arm; 19. Fifth motor; 20, welding gun; 21, first sand storage box; 22, compressed air tank; 23, third motor; 24, first rotating arm; 25, sand blasting head; 26, second sand storage box; 27, sand suction head; 28, universal joint; 29, seventh motor; 30, vacuum pump; 31, positioning sensor; 32, fourth motor; 33, third rotating arm; 34, heating frame; 35, heating plate

DETAILED DESCRIPTION OF THE EMBODIMENTS

The technical solutions in the embodiments of the present invention will be clearly and completely described below in conjunction with the accompanying drawings in the embodiments of the present invention, and it is clear that the embodiments described are only a part of the embodiments of the present invention and not all of them. Based on the embodiments in the present invention, all other embodiments obtained by a person of ordinary skill in the art without creative labor fall within the scope of protection of the present invention.

To make the above-mentioned objects, features and advantages of the present invention more obvious and understandable, the invention is described in further detail below in conjunction with the accompanying drawings and specific embodiments.

Figure 1:
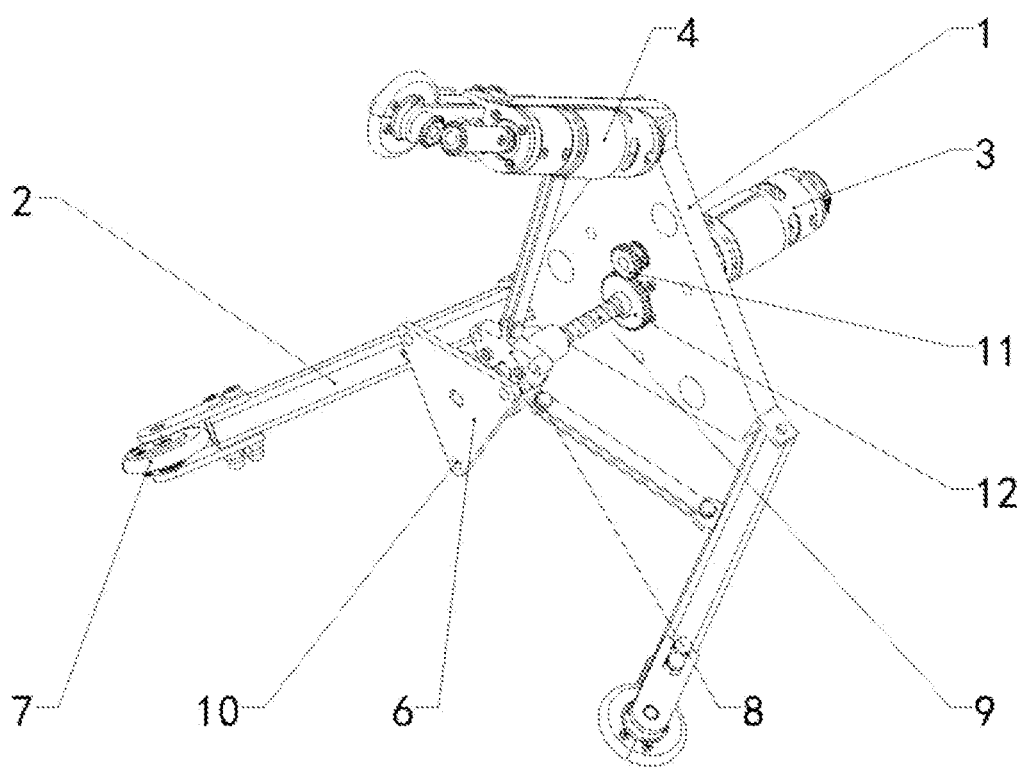
FIG. 1 is an axonometric view of the mobile assembly of the present invention.
Figure 2:
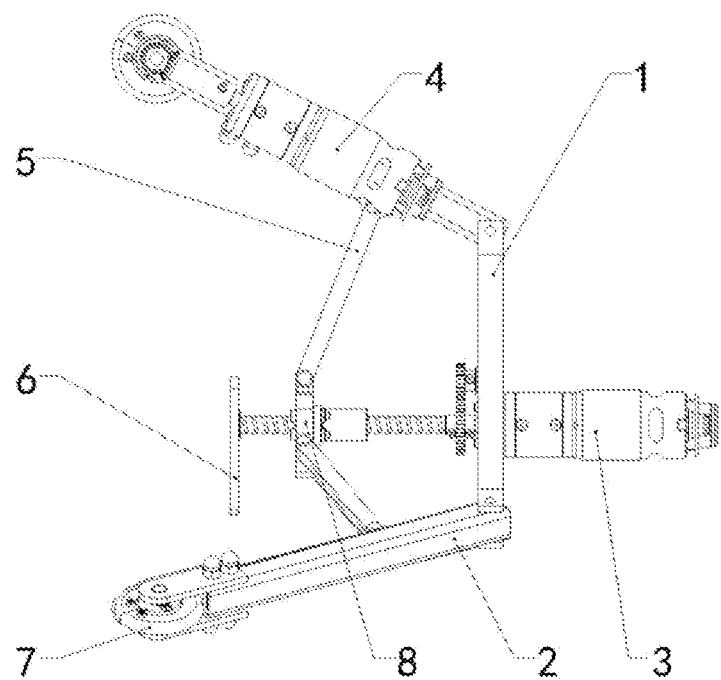
FIG. 2 is a main view of the mobile assembly of the present invention.
Figure 3:
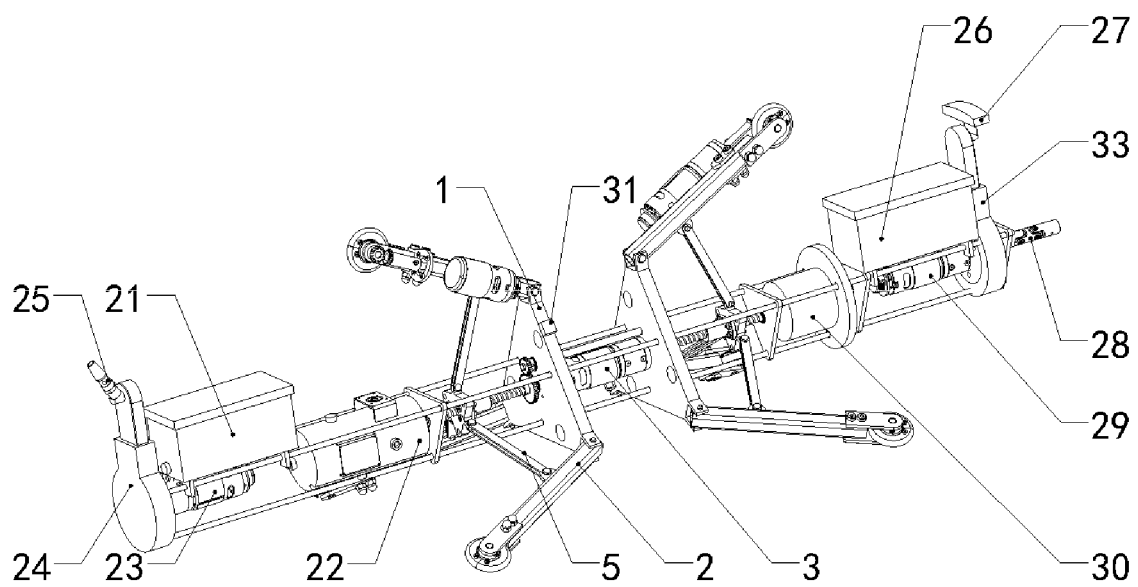
FIG. 3 is an axonometric view of the pre-weld sandblasting mechanism and recovery mechanism of the present invention.
Figure 4:
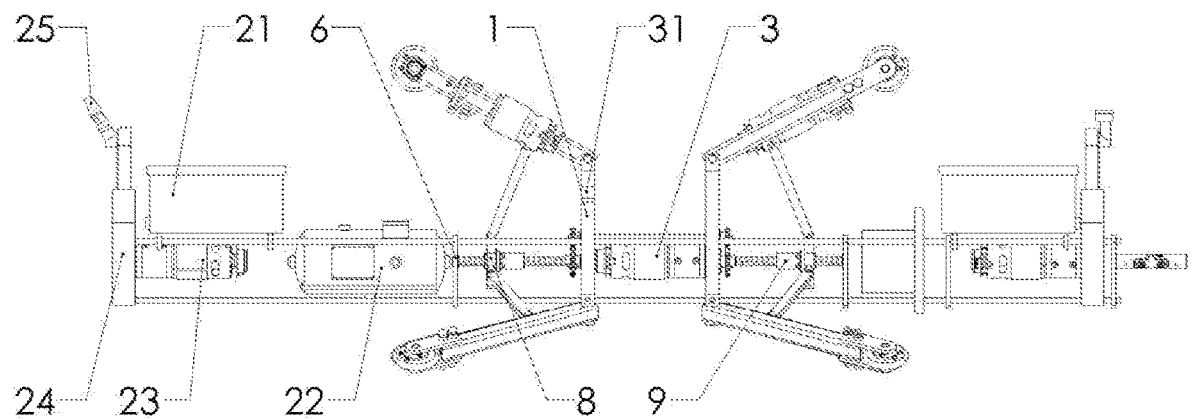
FIG. 4 is a main view of the pre-weld sandblasting mechanism and recovery mechanism of the present invention.
Figure 5:
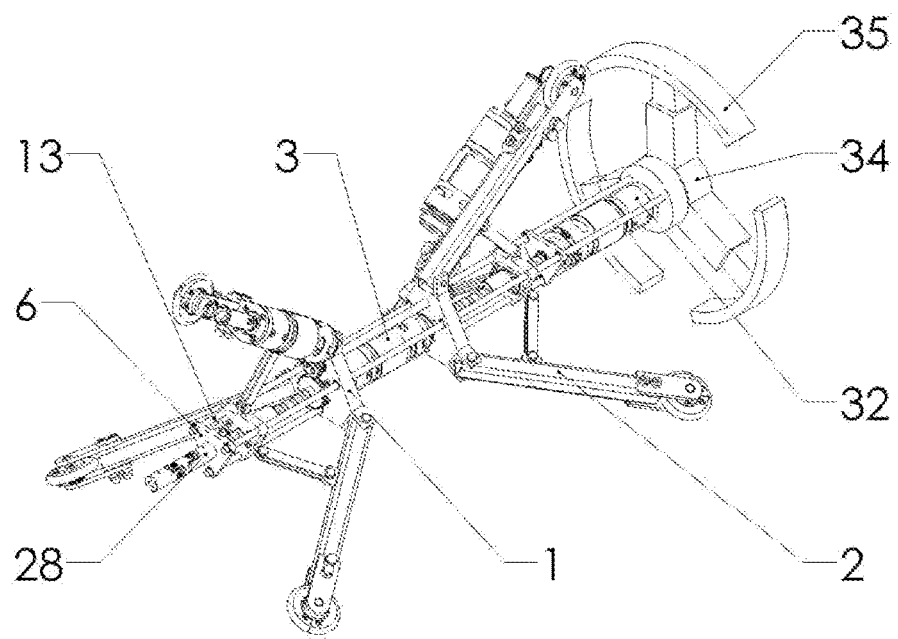
FIG. 5 shows an axonometric view of the heating mechanism of the present invention.
Figure 6:
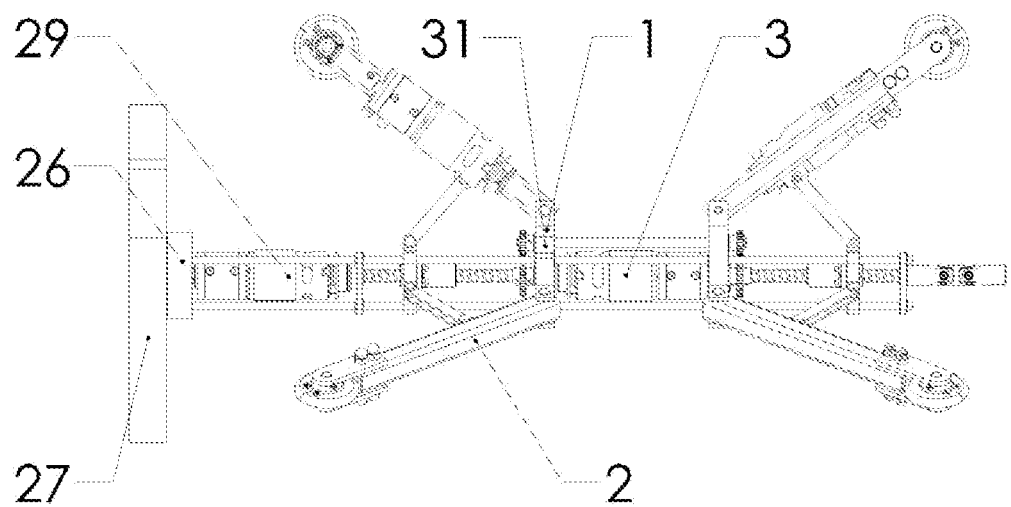
FIG. 6 is a main view of the heating mechanism of the present invention.
Figure 7:
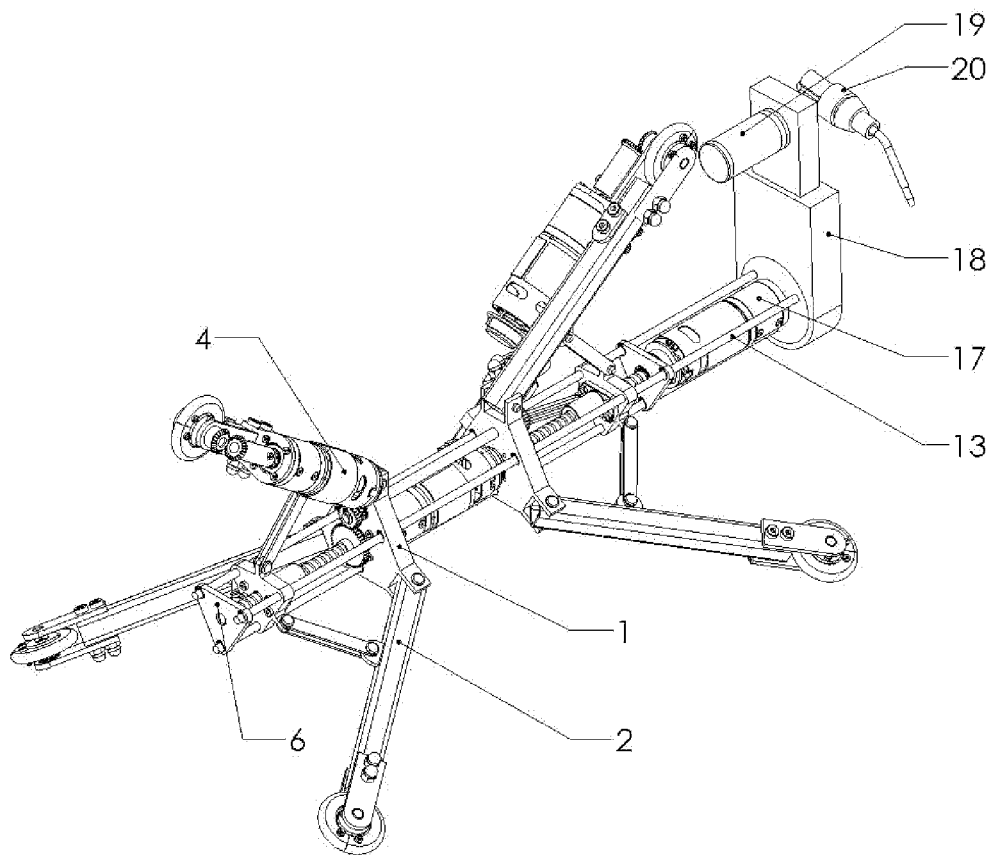
FIG. 7 is an axonometric view of the welding repair mechanism of the present invention.
Figure 8:
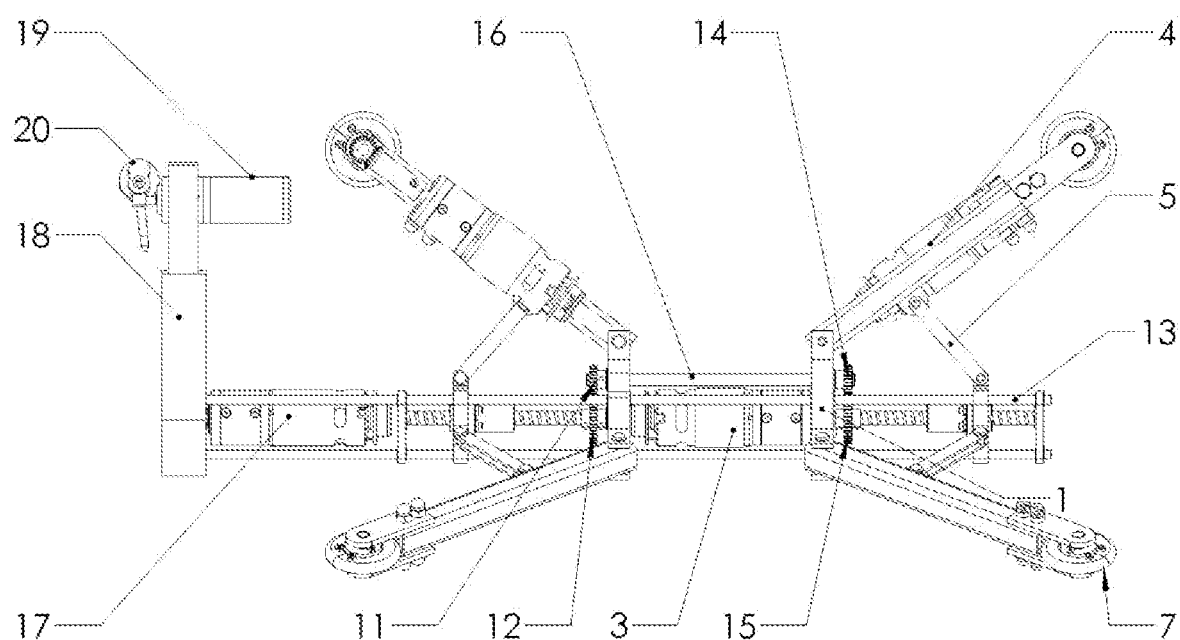
FIG. 8 is a main view of the welding repair mechanism of the present invention.

Referring to FIGS. 1-8, the present invention provides a flexible adaptive large length to thin ratio pipeline intelligent repair device, including a walking mechanism, the walking mechanism includes a walking bracket and a radius adjustment assembly, and the radius adjustment assembly is located in the middle of the walking bracket. The walking mechanism is provided with a first motor 3 for driving the radius adjustment assembly, and the walking bracket is provided with a second motor 4 for driving the movement of the walking bracket; the walking bracket is detachably connected with a number of groups of connecting rods 13, and the ends of a number of groups of connecting rods 13 are detachably connected with a working part, and the working part includes a pre-weld sandblasting mechanism, a heating mechanism and a welding repair mechanism; the walking bracket is provided with a positioning sensor 30 The pre-weld sandblasting mechanism includes a sandblasting head 25, a first rotating arm 24 for controlling the rotation of the sandblasting head 25, a third motor 23 for powering the first rotating arm 24, a first sand storage tank 21 for supplying sand to the sandblasting head 25, and a compressed gas tank for powering the sandblasting work of the sandblasting head 25; the heating mechanism includes a heating frame 34 and a fourth motor 32 for driving the rotation of the heating frame 34. The heating mechanism includes a heating frame 34 and a fourth motor 32 for driving the rotation of the heating frame 34, which is rotatably connected to the connecting rod 13; the welding repair mechanism includes a welding gun 20, a fifth motor 19 for adjusting the angle of the welding gun 20, a second rotating arm 18 for controlling the rotation of the welding gun 20, and a sixth motor 17 for providing power to the second rotating arm 18. The present invention provides an intelligent repair device suitable for the internal repair of large length-thin ratio pipelines. It can realize the integrated repair process such as internal sandblasting and self-cleaning, preheating, all-position, and post-treatment. The invention has high efficiency, good quality, low labor intensity, and can realize a series of repair operations such as sandblasting, cleaning, preheating, repairing and post-heating; the device can repair 360° in all positions; it is suitable for adaptive repair of large length and thin ratio pipes, especially bends. The invention provides a variable-diameter all-position intelligent pipe internal repair device integrating pre-welding cleaning, preheating, welding repair and post-welding heat treatment, which can effectively deal with oil, rust and scale on the internal and external surfaces of the pipe through pre-welding cleaning module to ensure smooth welding repair, as well as pre-welding preheating and post-welding heat treatment by the heating mechanism to effectively ensure the quality of welding repair.

The travel support includes two groups of symmetrically arranged travel assemblies, the first motor 3 is located between the two groups of travel assemblies and is fixedly connected to both groups of travel assemblies. The output shaft of the first motor 3 is arranged vertically with both groups of travel assemblies; each group of travel assemblies includes a mounting plate 1, three travel arms 2 are hinged equally spaced around the circumference of the mounting plate 1, each group of travel arms 2 is connected with a travel wheel 7, one of the travel arms 2 is fixed with a second motor 4 for driving the rotation of the travel wheel 7. The output shaft of the second motor 4 is connected to a first bevel gear, and a second bevel gear is connected to one end of the travel wheel 7. The first bevel gear and the second bevel gear mesh with each other, and they are arranged vertically, and the first motor 3 drives the first bevel gear to rotate, and the first bevel gear mobilizes the second bevel gear to rotate, and then drives the traveling wheel 7 to rotate, so as to realize the forward or backward movement of the device as a whole.

The radius adjustment assembly is provided with two groups, each group of radius adjustment assembly corresponds to a group of walking assembly, each group of radius adjustment includes connecting plate 8, connecting plate 8 has three connecting rods 5 hinged on the circumference, each rod 5 corresponds to a walking arm 2, and the corresponding connecting rods 5 and walking arm 2 are hinged to each other; the radius adjustment assembly can adjust the opening range of three groups of walking arms 2, so that the device can be applied to pipes of different diameters and improve the practicality of the device.

The first motor 3 is rotatably connected to the screw 9 in the middle of one side of the mounting plate 1 away from the first motor 3, and the screw 9 is threaded to the middle of the connecting plate 8; the first motor 3 is rotatably connected to the screw 9 through a gear transmission assembly.

The gear transmission assembly includes mutually meshing first gear 12 and second gear 11, and mutually meshing third gear 14 and fourth gear 15, with a drive rod 16 fixedly connected between the second gear 11 and the third gear 14; the first gear 12 and the second gear 11 are located on one side of the mounting plate 1 away from the first motor 3 and are rotatably connected to the mounting plate 1, and the third gear 14 and the fourth gear 15 are located on another side of the mounting plate 1 away from the first motor 3. The third gear 14 and the fourth gear 15 are located on the side of another set of mounting plate 1 away from the first motor 3 and are rotatably connected to the mounting plate 1; the output shaft of the first motor 3 runs through the first set of mounting plate 1 and is fixedly connected to the middle of the first gear 12.

There are two sets of screws 9, the middle of the first gear 12 is fixedly connected to one screw 9 on the side away from the first motor 3, and the middle of the fourth gear 15 is fixedly connected to another screw 9 on the side away from the first motor 3; the screw 9 is rotatably connected to the fixing plate 6 on the end away from the first gear 12, and the fixing plate 6 is fixedly connected to the mounting plate 1 through the connecting rod 13.

The two sets of fixed plates 6 are in the shape of equilateral triangles, and each set of fixed plates 6 is provided with a through-hole 10 at the corners, and there are three connecting rods 13, which are arranged in parallel and flush at the ends, and the three connecting rods 13 penetrate the through-hole 10 on the two sets of fixed plates 6 in turn.

The compressed air tank 22 is located between the three connecting rods 13 and is removably connected to the connecting rod 13, the compressed air tank 22 is arranged close to the side of the fixed plate 6 and is removably connected to the fixed plate 6; the first sand storage tank 21 is arranged close to the compressed air tank 22 and the two connecting rods 13 are fixedly connected, the third motor 23 is located below the first sand storage tank 21, the first rotating arm 24 is located at the end of the connecting rod 13, the third The output shaft of the third motor 23 is fixedly connected to the rotating arm; the positioning sensor 30 is used to position the sand, and the compressed air is used as the power to spray the sand through the nozzle to the weld seam to complete sandblasting, where the sandblasting head 25 can be telescoped and rotated 360° to ensure comprehensive sandblasting of the interior of the pipe.

The other end of the three connecting rods 13 is provided with a sand suction assembly, the sand suction assembly includes a vacuum pump 30 arranged immediately outside the other fixed plate 6, the vacuum pump 30 is connected to the second sand storage tank 26 and the sand suction head 27, the second sand storage tank 26 is detachably connected to the outside of the connecting rod 13, the sand suction head 27 is mounted on a third rotating arm, the third rotating arm is located at the end of the connecting rod 13 and connected to a seventh motor 29. The above recovery mechanism consists of a walking device carrying a positioning sensor 30, a sand suction head 27, and a seventh motor 29, with the seventh motor 29 providing suction and the sand suction head 27 sucking the sand back for recovery, and the sand suction head 27 being retractable and rotatable 360°.

The heating frame 34 has three sets of arc-shaped heating plates detachably connected outside, and all three sets of heating plates are heated by resistance. The heating plate 35 is mounted on the heating frame 34 and can be moved radially along the heating frame 34 to accommodate different radius fittings and adjusted to a suitable length for preheating and post-weld heat treatment of the inner wall of the fittings.

The fifth motor 19 is directly connected to the welding gun 20, the body of the fifth motor 19 is fixedly connected to the side of the second rotating arm 18, and the sixth motor 17 is located inside the three sets of connecting rods 13. The power supply and welding wire are provided externally, and the positioning sensor 30 is positioned to perform the weld repair. The fifth motor 19 can adjust the angle of the second rotating arm 18 to achieve multi-angle automatic welding repair. The second rotating arm 18 is adjustable in radius to accommodate different radius fittings. The first rotating arm 24, the second rotating arm 18 and the third rotating arm 33 are all automatically adjustable in extension.

Work Process:
a. The travel mechanism with the pre-weld sandblasting mechanism, the travel mechanism with the heating mechanism and the travel mechanism with the welding repair mechanism are connected sequentially. The heating mechanism is installed in a plurality of groups, so that the post-welding part of the pipeline can be heat treated after welding. The walking mechanism is the same walking mechanism, and the two adjacent walking mechanisms can be connected by universal joints 28, only need to install the pre-weld sandblasting mechanism or heating mechanism or welding repair mechanism on the walking mechanism. The abovementioned pre-weld sandblasting or heating or welding repair mechanism are connected to the connecting rod 13 of the walking mechanism line;
b. Place all connected walking mechanisms into the pipe to be repaired;
c. Adjust the opening radius of each walking mechanism according to the inner diameter of the pipe to be repaired; after putting in, the walking mechanism is not opened, and when the device is completely put in, start the first motor 3, the first motor 3 will drive the transmission gear assembly to rotate, and then drive the screw 9 to move, and through the connecting plate 8 drive the connecting rod 5 to control the walking arm 2 to open, so that the traveling wheel 7 fits the inner wall of the pipe;
d. Control the travel mechanism to move to the position to be repaired inside the pipeline; position the device automatically to the part to be repaired inside the pipeline by positioning the position to be repaired by the positioning sensor 30;
e. In the position to be repaired, the sand blasting mechanism, the heating mechanism and the welding repair mechanism are controlled to work sequentially; after the sand blasting mechanism blasts sand at the position to be repaired, the sand suction mechanism at the rear of the sand blasting mechanism can recover the sand inside the pipe; then the heating mechanism opens to fit inside the pipe diameter and energizes the resistance to heat up the position to be repaired, and then the welding repair mechanism is controlled to weld.

In the description of the present invention, it is to be understood that the terms "longitudinal", "transverse", "up", "down", "front", "back", "left", "right", "vertical", "horizontal". "vertical", "horizontal", "top", "bottom", "inside The orientations or positional relationships indicated by "top", "bottom", "inside", "outside", etc. are based on the orientations or positional relationships shown in the accompanying drawings and are intended only to facilitate the description of the invention, not to indicate or imply that the devices or components referred to must have a particular orientation, be constructed and operate in a particular orientation, and therefore are not to be construed as a limitation of the invention.

The above described embodiments are only a description of the preferred way of the present invention, not a limitation of the scope of the present invention, and all kinds of variations and improvements of the technical solutions of the present invention made by a person of ordinary skill in the art shall fall within the scope of protection determined by the claims of the present invention, without departing from the spirit of the design of the present invention.

What is claimed is:

1. A flexible adaptive large length-to-thin ratio pipeline intelligent repair device, comprising groups of walking mechanisms, each group of walking mechanisms comprises a walking bracket and a radius adjustment assembly; the radius adjustment assembly is located in a middle of the walking bracket, and a first motor is provided in a middle of the walking mechanism for driving the radius adjustment assembly; the walking bracket is provided with a second motor for driving a movement of the walking bracket; the walking bracket is detachably connected to first connecting rods, and ends of the first connecting rods are detachably connected to a working part, and the working part comprises a pre-weld sand blasting mechanism or a heating mechanism or a welding repair mechanism; the walking bracket is provided with a positioning sensor; two adjacent groups of walking mechanisms are connected to each other by a universal joint connected;

the pre-weld sand blasting mechanism comprises a sand blasting head, a first rotating arm for controlling a rotation of the sand blasting head, a third motor for providing power to the first rotating arm, a first sand storage tank for supplying sand to the sand blasting head, and a compressed air tank for providing power to a sand blasting work of the sand blasting head;

the heating mechanism comprises a heating frame and a fourth motor for driving a rotation of the heating frame, wherein the fourth motor is rotatably connected to the first connecting rods;

the welding repair mechanism comprises a welding gun, a fifth motor for adjusting an angle of the welding gun, a second rotating arm for controlling a rotation of the welding gun, and a sixth motor for providing power to the second rotating arm.

2. The flexible adaptive large length-to-thin ratio pipeline intelligent repair device according to claim 1, wherein the walking bracket comprises two groups of walking components symmetrically arranged; the first motor is located between the two groups of walking components and is fixedly connected to the two groups of walking components; each group of walking components comprises a mounting plate, and the mounting plate is circumferentially hinged with three walking arms equally spaced; each of the three walking arms is connected to a travel wheel, and one of the three walking arms is fixed with the second motor for driving a rotation of the travel wheel.

3. The flexible adaptive large length-to-thin ratio pipeline intelligent repair device according to claim 2, wherein two groups of radius adjustment assemblies are provided, the two groups of radius adjustment assemblies correspond to the two groups of walking components one by one, each group of radius adjustment assemblies comprises a connecting plate, three second connecting rods are hinged on a circumference of the connecting plate, each second connecting rod corresponds to one of the three walking arm, and the three second connecting rods are articulated with the three walking arms;

the mounting plate has a screw rotatably connected to a middle of one side away from the first motor, and the screw is connected to a middle of the connecting plate through threads; the first motor is rotatably connected to the screw through a gear transmission assembly.

4. The flexible adaptive large length-to-thin ratio pipeline intelligent repair device according to claim 3, wherein the gear transmission assembly comprises a first gear and a second gear meshing with each other, and a third gear and a fourth gear meshing with each other; a drive rod is fixedly connected between the second gear and the third gear; the first gear and the second gear are located on a side of a first group of mounting plates away from the first motor and are pivotally connected to the first group of mounting plates; the third gear and the fourth gear are located on a side of a second group of mounting plates away from the first motor and are rotatably connected to the second group of mounting plates; and an output shaft of the first motor runs through the first group of mounting plates and is fixedly connected to a middle of the first gear.

5. The flexible adaptive large length-to-thin ratio pipeline intelligent repair device according to claim 4, wherein two screws are provided, a central side of the first gear away from the first motor is fixedly connected to a first screw, a central side of the fourth gear away from the first motor is fixedly connected to a second screw; the two screws are rotatably connected to a fixed plate at one end away from the first gear, and the fixed plate is fixedly connected to the mounting plate through the first connecting rod.

6. The flexible adaptive large length-to-thin ratio pipeline intelligent repair device according to claim 5, wherein two groups of fixed plates are in the shape of equilateral triangle, each group of fixed plates are provided with through holes at corners, three first connecting rods are provided, the three first connecting rods are arranged parallel and ends of the three first connecting rods are flush, and the three first connecting rods in turn passes through the two groups of the fixed plates on the through holes.

7. The flexible adaptive large length-to-thin ratio pipeline intelligent repair device according to claim 6, wherein the compressed air tank is located between the three first connecting rods and is removably connected to the three first connecting rods; the compressed air tank is arranged close to a side of the fixed plate and is removably connected to the fixed plate; the first sand storage tank is arranged close to the compressed air tank and fixedly connected to two of the three first connecting rods; the third motor is located under the first sand storage tank; the first rotating arm is located at a first end of the three first connecting rods, and an output shaft of the third motor is fixedly connected to the first rotating arm;

a second end of the three first connecting rods is provided with a sand suction assembly, the sand suction assembly comprises a vacuum pump arranged immediately outside of the other fixed plate, the vacuum pump is connected to a second sand storage tank and a sand suction head, the second sand storage tank is detachably connected to an outside of the three first connecting rods, the sand suction head is mounted on a third rotating arm, and the third rotating arm is located at the first end of the three first connecting rods and is connected to a seventh motor.

8. The flexible adaptive large length-to-thin ratio pipeline intelligent repair device according to claim 7, wherein three sets of arc-shaped heating plates are detachably connected to an outside of the heating frame, and the three sets of arc-shaped heating plates are heated by resistors.

9. The flexible adaptive large length-to-thin ratio pipeline intelligent repair device according to claim 8, wherein the fifth motor is directly connected to the welding gun, a body of the fifth motor is fixedly connected to a side of the second rotating arm, and the sixth motor is located inside the three first connecting rods.

10. A method of using the flexible adaptive large length-to-thin ratio pipeline intelligent repair device according to claim 1, comprising the following steps:

a. connecting a first walking mechanism installed with the pre-weld sand blasting mechanism, a second walking mechanism installed with the heating mechanism and a third walking mechanism installed with the welding repair mechanism in sequence;

b. placing all the first, second and third walking mechanisms into a pipe to be repaired;

c. adjusting an opening radius of each of the first, second and third walking mechanism according to an inner diameter of the pipe to be repaired;

d. controlling the first, second and third walking mechanism to move to a position to be repaired inside the pipe; and e. controlling the pre-weld sand blasting mechanism, the heating mechanism and welding repair mechanism in order to work in the position to be repaired.

11. The method according to claim 10, wherein the walking bracket comprises two groups of walking components symmetrically arranged; the first motor is located between the two groups of walking components and is fixedly connected to the two groups of walking components; each group of walking components comprises a mounting plate, and the mounting plate is circumferentially hinged with three walking arms equally spaced; each of the three walking arms is connected to a travel wheel, and one of the three walking arms is fixed with the second motor for driving a rotation of the travel wheel.

12. The method according to claim 11, wherein two groups of radius adjustment assemblies are provided, the two groups of radius adjustment assemblies correspond to the two groups of walking components one by one, each group of radius adjustment assemblies comprises a connecting plate, three second connecting rods are hinged on a circumference of the connecting plate, each second connecting rod corresponds to one of the three walking arm, and the three second connecting rods are articulated with the three walking arms;

the mounting plate has a screw rotatably connected to a middle of one side away from the first motor, and the screw is connected to a middle of the connecting plate through threads; the first motor is rotatably connected to the screw through a gear transmission assembly.

13. The method according to claim 12, wherein the gear transmission assembly comprises a first gear and a second gear meshing with each other, and a third gear and a fourth gear meshing with each other; a drive rod is fixedly connected between the second gear and the third gear; the first gear and the second gear are located on a side of a first group of mounting plates away from the first motor and are pivotally connected to the first group of mounting plates; the third gear and the fourth gear are located on a side of a second group of mounting plates away from the first motor and are rotatably connected to the second group of mounting plates; and an output shaft of the first motor runs through the first group of mounting plates and is fixedly connected to a middle of the first gear.

14. The method according to claim 13, wherein two screws are provided, a central side of the first gear away from the first motor is fixedly connected to a first screw, a central side of the fourth gear away from the first motor is fixedly connected to a second screw; the two screws are rotatably connected to a fixed plate at one end away from the first gear, and the fixed plate is fixedly connected to the mounting plate through the first connecting rod.

15. The method according to claim 14, wherein two groups of fixed plates are in the shape of equilateral triangle, each group of fixed plates are provided with through holes at corners, three first connecting rods are provided, the three first connecting rods are arranged parallel and ends of the three first connecting rods are flush, and the three first connecting rods in turn passes through the two groups of the fixed plates on the through holes.

16. The method according to claim 15, wherein the compressed air tank is located between the three first connecting rods and is removably connected to the three first connecting rods; the compressed air tank is arranged close to a side of the fixed plate and is removably connected to the fixed plate; the first sand storage tank is arranged close to the compressed air tank and fixedly connected to two of the three first connecting rods; the third motor is located under the first sand storage tank; the first rotating arm is located at a first end of the three first connecting rods, and an output shaft of the third motor is fixedly connected to the first rotating arm;

a second end of the three first connecting rods is provided with a sand suction assembly, the sand suction assembly comprises a vacuum pump arranged immediately outside of the other fixed plate, the vacuum pump is connected to a second sand storage tank and a sand suction head, the second sand storage tank is detachably connected to an outside of the three first connecting rods, the sand suction head is mounted on a third rotating arm, and the third rotating arm is located at the first end of the three first connecting rods and is connected to a seventh motor.

17. The method according to claim 16, wherein three sets of arc-shaped heating plates are detachably connected to an outside of the heating frame, and the three sets of arc-shaped heating plates are heated by resistors.

18. The method according to claim 17, wherein the fifth motor is directly connected to the welding gun, a body of the fifth motor is fixedly connected to a side of the second rotating arm, and the sixth motor is located inside the three first connecting rods.

* * * * *